United States Patent [19]
Taylor et al.

[11] 4,315,971
[45] Feb. 16, 1982

[54] SOUND DEADENING

[75] Inventors: Peter A. J. Taylor; George W. Hammond, both of Peterborough, England

[73] Assignee: Massey-Ferguson Services N.V., Curacao, Netherlands Antilles

[21] Appl. No.: 152,863

[22] Filed: May 23, 1980

[30] Foreign Application Priority Data

May 23, 1979 [GB] United Kingdom ............... 18057/79

[51] Int. Cl.[3] ......................... B32B 27/06; B05D 1/02

[52] U.S. Cl. .................................... 428/419; 181/290; 181/296; 427/405; 427/406; 427/409; 427/421; 428/425.8; 428/447; 428/450; 428/457

[58] Field of Search ............... 427/405, 406, 409, 421; 428/419, 425.8, 447, 450, 457; 181/290, 296

[56] References Cited

U.S. PATENT DOCUMENTS

| | | | |
|---|---|---|---|
| 3,574,108 | 4/1971 | Lewis | 428/425.8 X |
| 3,577,306 | 5/1971 | Baker et al. | 428/425.8 X |
| 3,894,169 | 7/1975 | Miller | 427/409 X |
| 4,101,698 | 7/1978 | Dunning et al. | 428/425.8 X |
| 4,190,131 | 2/1980 | Robinson | 181/296 |
| 4,223,069 | 9/1980 | Berghmans | 428/447 X |

*Primary Examiner*—Shrive P. Beck
*Attorney, Agent, or Firm*—William R. Nolte

[57] ABSTRACT

A sound deadening coating is provided on an article, such as an engine cover, by applying a polysulphide, silicone or polyurethane rubber layer to the surface of the article and applying a layer of zinc, aluminium or ferrous metal or their alloys to the rubber layer. Preferably, polysulphide rubber and zinc metal are used. The metal or alloy may be applied to the rubber layer when the latter is only partly cured. Preferably, the rubber and metal layers are sprayed.

12 Claims, No Drawings

SOUND DEADENING

This invention relates to the sound-deadening of articles such as covers for internal combustion engines.

We have already proposed a constrained layer sound deadening treatment for engines in which a thin layer of a nitrile rubber-based adhesive is sprayed on to at least part of the surface of the engine, and a layer of lead or lead alloy is sprayed on to the rubber.

A particular advantage of this method of sound deadening is that it involves the use of spraying techniques that are conventional and well-established and are suitable for automatic production line treatment. However, the use of lead presents a health hazard, and nitrile rubber has a tendency to age and flake when sprayed with metal.

According to the present invention therefore, we propose to provide a sound deadening coating on an article by applying a polysulphide, silicone or polyurethane rubber layer to the surface of the article and applying a layer of zinc, aluminium or ferrous metal or their alloys to said rubber layer.

Polysulphide, silicone and polyurethane rubbers have good acoustical and physical properties, and chemical resistance to fuels and oils, and are not prone to flaking. Polysulphide rubber is the preferred material and a suitable example is PR6422A manufactured and marketed by "Berger Elastomers." A suitable silicone rubber is an R.T.V. (Room Temperature Vulcanising) silicone rubber.

Zinc, aluminium and ferrous metal and their alloys are all safe metals to handle and are less costly than lead. Zinc is the preferred material because it bonds well on the rubber layer, particularly, polysulphide rubber. When using aluminium and ferrous metals, these may be applied directly to the rubber, or may be applied to a thin layer of zinc that is first applied to the rubber. The ferrous metals include steel.

The thickness of the layers of rubber and metal can be selected in a known manner to give maximum attenuation of surface vibration and hence maximum sound deadening. For example, in the case of cast aluminium and pressed steel engine components treated with a coating of polysulphide rubber and zinc, the optimum thickness of the polysulphide rubber is 0.5 to 1.0 mm and the optimum thickness of the zinc is 3.0 to 4.0 mm for the cast aluminium components and 1.5 to 2.0 mm for the pressed steel components.

The rubber may be allowed to cure fully before applying the metal layer to it, the rate of curing being controlled by the ambient temperature. Alternatively, in order to speed up the treatment process and possibly to improve the bonding between the rubber and metal, the metal may be applied to the rubber when the latter is only partly cured.

Preferably, the rubber and metal layers are sprayed on. The layers may be sprayed by operators using hand-held tools or by automatic machines.

In a typical example, the timing cover of an engine is treated according to the engine by spraying with a polysulphide rubber layer and then a zinc metal layer.

We claim:

1. A method of sound deadening an article by suppressing emission of sound by vibration of said article comprising applying to the surface of the article a first layer of a resilient material selected from the group consisting of polysulphide, silicone and polyurethane rubber, and applying to said first layer a second layer consisting of a continuous material selected from the group consisting of zinc, aluminum, and ferrous metal and their alloys.

2. A method as claimed in claim 1 in which said first layer comprises a polysulphide rubber and said second layer consisting of zinc metal.

3. A method as claimed in claim 2 in which the polysulphide rubber layer is 0.5 to 1.00 mm thick and the zinc metal layer is 1.5 to 4.0 mm thick.

4. A method as claimed in claim 1 in which a layer of zinc metal is applied to said first layer and a material selected from the group consisting of aluminum, ferrous metal and their alloys is applied to the zinc.

5. A method as claimed in claim 1 in which the second layer is applied to said first layer before the latter has fully cured.

6. A method as claimed in claim 1 in which the first layer is sprayed on.

7. A method as claimed in claim 1 in which the second layer is sprayed on.

8. An article provided with a sound deadening coating for suppressing emission of sound by vibration of said article comprising a first layer of a resilient material selected from the group consisting of polysulphide, silicone and polyurethane rubber applied to the surface of the article and a second layer consisting of a continuous material selected from the group consisting of zinc, aluminum, ferrous metal and their alloys applied to said first layer.

9. An article as claimed in claim 8 in which said first layer comprises polysulphide rubber 0.5 to 1.0 mm thick.

10. An article as claimed in claim 9 in which a layer of zinc metal is applied to said polysulphide rubber.

11. An article as claimed in claim 10 which is composed of cast aluminium and in which said zinc metal layer is 3.0 to 4.0 mm thick.

12. An article as claimed in claim 10 which is a pressed steel component and in which said zinc metal layer is 1.5 to 2.0 mm thick.

* * * * *